US010802760B2

(12) United States Patent
Zaretsky et al.

(10) Patent No.: US 10,802,760 B2
(45) Date of Patent: Oct. 13, 2020

(54) APPARATUS AND METHOD OF INTELLIGENT DYNAMIC APPLICATION AWARE STORAGE DEVICE OPTIMIZATION

(71) Applicant: DELL PRODUCTS, LP, Round Rock, TX (US)

(72) Inventors: Lee Zaretsky, Pflugerville, TX (US); Farzad Khosrowpour, Pflugerville, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/292,818

(22) Filed: Mar. 5, 2019

(65) Prior Publication Data

US 2020/0285415 A1 Sep. 10, 2020

(51) Int. Cl.
*G06F 3/06* (2006.01)
(52) U.S. Cl.
CPC .......... *G06F 3/0659* (2013.01); *G06F 3/0604* (2013.01); *G06F 3/0653* (2013.01); *G06F 3/0673* (2013.01)
(58) Field of Classification Search
CPC .... G06F 3/0659; G06F 3/0604; G06F 3/0653; G06F 3/0673
See application file for complete search history.

(56) References Cited

U.S. PATENT DOCUMENTS

| 7,269,534 | B2 | 9/2007 | Mugunda et al. | |
|---|---|---|---|---|
| 7,817,626 | B2 | 10/2010 | Nakamura et al. | |
| 2013/0312005 | A1* | 11/2013 | Chiu | G06F 3/0685 718/105 |
| 2014/0156877 | A1* | 6/2014 | Tylik | G06F 3/0605 710/18 |
| 2015/0172169 | A1 | 6/2015 | Decusatis et al. | |
| 2016/0077741 | A1* | 3/2016 | Newby, Jr. | G06F 3/0647 711/165 |
| 2017/0142093 | A1 | 5/2017 | Oelke | |
| 2018/0260158 | A1* | 9/2018 | Marripudi | G06F 3/0653 |

* cited by examiner

*Primary Examiner* — Edward J Dudek, Jr.
(74) *Attorney, Agent, or Firm* — Larson Newman, LLP

(57) ABSTRACT

An information handling system with an improved dynamic application-aware storage optimization includes an application core that is configured to create a plurality of workload descriptors. The workload descriptors may represent workload requirements to implement a particular application program. A data engine performs an analysis of the workload descriptors, and based on the performed analysis the data engine generates a hint. A storage device is configured to use the hint in managing data flow in the information handling system.

19 Claims, 4 Drawing Sheets

APPARATUS AND METHOD OF INTELLIGENT DYNAMIC APPLICATION AWARE STORAGE DEVICE OPTIMIZATION

FIELD OF THE DISCLOSURE

This disclosure generally relates to information handling systems, and more particularly relates to intelligent dynamic application-aware storage device optimization.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a data engine that is configured to implement an improved dynamic application-aware storage optimization in an information handling system. The data engine performs an analysis of workload descriptors and based on the performed analysis, the data engine generates a hint that is used by a hardware storage device to manage data flow in the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
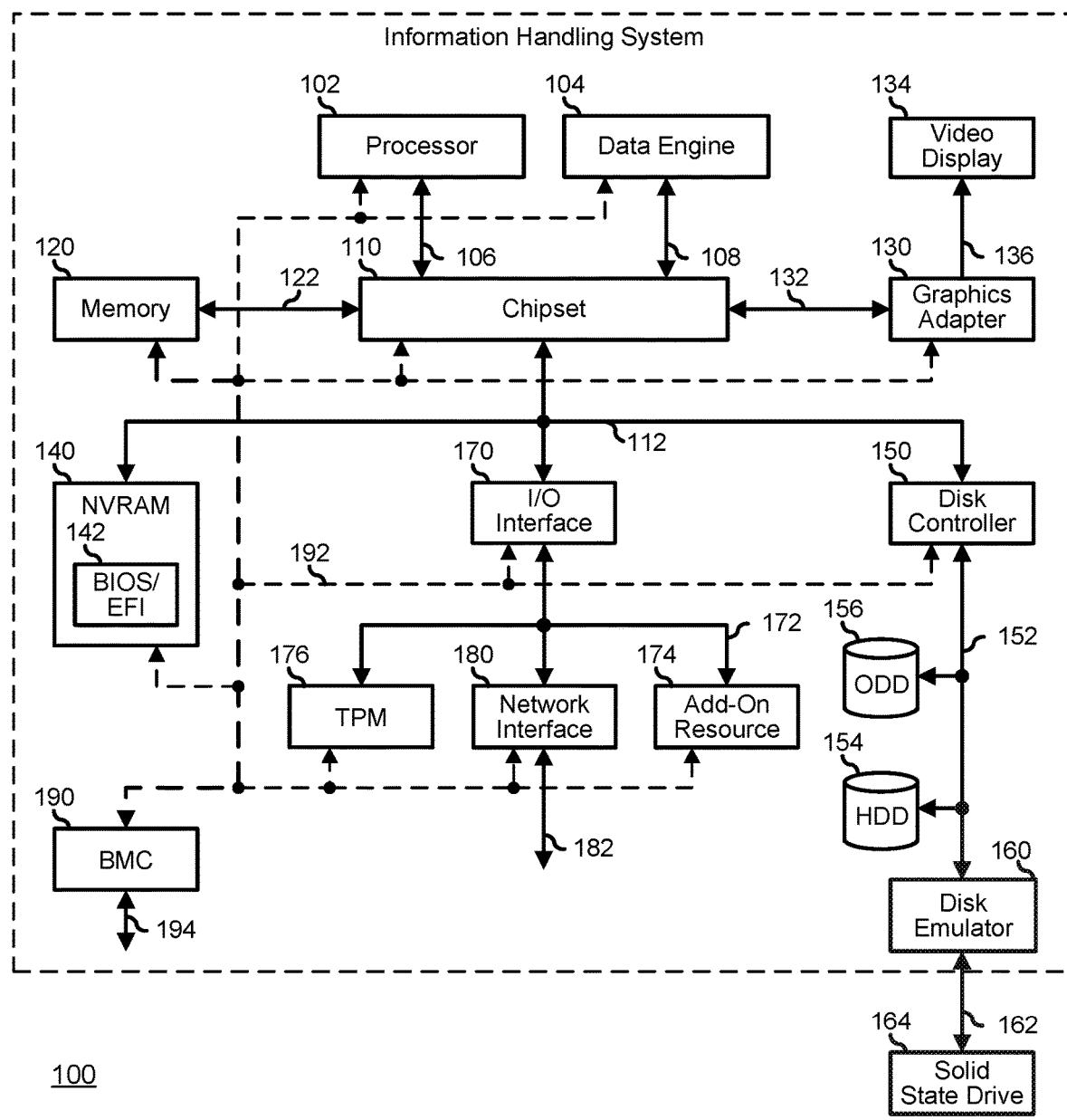
FIG. 1 is a block diagram of a generalized information handling system.

FIG. 1 illustrates an embodiment of an information handling system 100 including a processor 102, data engine 104, chipset 110, memory 120, graphics adapter 130 connected to video display 134, non-volatile RAM (NVRAM) 140 that includes a basic input and output system/extensible firmware interface (BIOS/EFI) module 142, disk controller 150, hard disk drive (HDD) 154, optical disk drive (ODD) 156, disk emulator 160 connected to solid state drive (SSD) 164, an input/output (I/O) interface 170 connected to an add-on resource 174, a trusted platform module (TPM) 176, a network interface 180, and a baseboard management controller (BMC) 190. Processor 102 is connected to chipset 110 via processor interface 106, and the data engine 104 is connected to chipset 110 via processor interface 108.

Chipset 110 represents an integrated circuit or group of integrated circuits that manages data flow between the processor 102 and data engine 104 and the other elements of information handling system 100. In a particular embodiment, chipset 110 represents a pair of integrated circuits, such as a north bridge component and a south bridge component. In another embodiment, some or all of the functions and features of chipset 110 are integrated with one or more of processors 102. Memory 120 is connected to chipset 110 via a memory interface 122. An example of memory interface 122 includes a Double Data Rate (DDR) memory channel, and memory 120 represents one or more DDR Dual In-Line Memory Modules (DIMIVIs). In a particular embodiment, memory interface 122 represents two or more DDR channels. In another embodiment, processor 102 may include memory interface 122 that provides a dedicated memory for the processor. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMIVIs (NVDIMIVIs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a peripheral component interconnect-express interface (PCIe) and graphics adapter 130 can include a four lane (x4) PCIe adapter, an eight lane (x8) PCIe adapter, a 16-lane (x16) PCIe adapter, or another configuration, as needed or desired. In a particular embodiment, graphics adapter 130 is provided on a system printed circuit board (PCB). Video display output 136 can include a digital video interface (DVI), a high definition multimedia interface (HDMI), DisplayPort interface, or the like. Video display 134 can include a monitor, a smart television, an embedded display such as a laptop computer display, or the like.

NVRAM 140, disk controller 150, and I/O interface 170 are connected to chipset 110 via I/O channel 112. An example of I/O channel 112 includes one or more point-to-point PCIe links between chipset 110 and each of NVRAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NVRAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources.

Disk controller 150 includes a disk interface 152 that connects the disc controller 150 to HDD 154, to ODD 156, and to disk emulator 160. Disk interface 152 may include an integrated drive electronics (IDE) interface, an advanced technology attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 1394 (Firewire) interface, a proprietary interface, or a combination thereof Alternatively, SSD 164 can be disposed within information handling system 100.

SSD 164 includes a solid-state device that uses integrated circuit assemblies as memory to store data persistently. In an embodiment, the SSD may use NOT-AND (NAND) flash memory that can retain data after an external power is lost. In this embodiment, the data engine may be configured to optimize configurations and capability of the SSD based upon workload requirements. The data engine can connect with the SSD through the disk controller 150 alongside the HDD and other storage devices. Furthermore, the data engine may be a standalone physical entity within the system or in a more generalized sense, the data engine may also be a virtual entity running on one or more processors, interfacing to the system by way of the processor to its chipset connections.

I/O interface 170 includes a peripheral interface 172 that connects I/O interface 170 to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, a separate circuit board or an add-in card disposed within information handling system 100, a device that is external to the information handling system, or a combination thereof Network interface device 180 represents a network communication device disposed within information handling system 100, on a main circuit board of the information handling system, integrated onto another element such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface 180 translates information from a format suitable to the peripheral channel to a format suitable to external devices. In a particular embodiment, network interface device 180 includes a network interface card (NIC) or host bus adapter (HBA), and an example of network channel 182 includes an InfiniBand channel, a fiber channel, a gigabit Ethernet channel, a proprietary channel architecture, or a combination thereof. Network channel 182 can be connected to an external network resource (not illustrated). The network resource can include another information handling system, a data storage system, another network, a grid management system, another suitable resource, or a combination thereof BMC 190 is connected to multiple elements of information handling system 100 via one or more management interface 192 to provide out of band monitoring, maintenance, and control of the elements of the information handling system. As such, BMC 190 represents a processing device different from the processor 102, which provides various management functions for information handling system 100. In an embodiment, BMC 190 may be responsible for granting access to an external device that may establish control of the elements to implement power management, cooling management, storage management, and the like. In this embodiment, the BMC may establish wireless communications with the external device through a Wi-Fi channel, a near-field communication (NFC) channel, a Bluetooth or Bluetooth-Low-Energy (BLE) channel, a cellular-based interface such as a global system for mobile (GSM) interface, a code-division multiple access (CDMA) interface, a universal mobile telecommunications system (UMTS) interface, a long-term evolution (LTE) interface, another cellular-based interface, or a combination thereof In an embodiment, the BMC 190 implements an integrated remote access controller (iDRAC) that operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NVRAM of the device or system that is the subject of the firmware update, thereby replacing the currently operating firmware associated with the device or system, and reboots information handling system, whereupon the device or system utilizes the updated firmware image.

In an embodiment, the processor 102 may be configured as a host-processor that generates metadata such as a workload descriptor to characterize a pattern of I/O for an application program. The workload descriptor, for example, may represent workload requirements to implement the pattern of I/O in the application program or set of application programs. In this embodiment, the data engine 104 is configured to uniquely define behavior of the pattern of I/O in a manner that classifies these application programs relative to parameters and configurations of a storage subsystem such as the SSD 164. In this regard, the information handling system utilizes an adaptive machine learning-based architecture that is combined with rule-based solutions to fully realize the application specific data prioritizations based on the dynamics of a changing set of workload demands.

Figure 2:
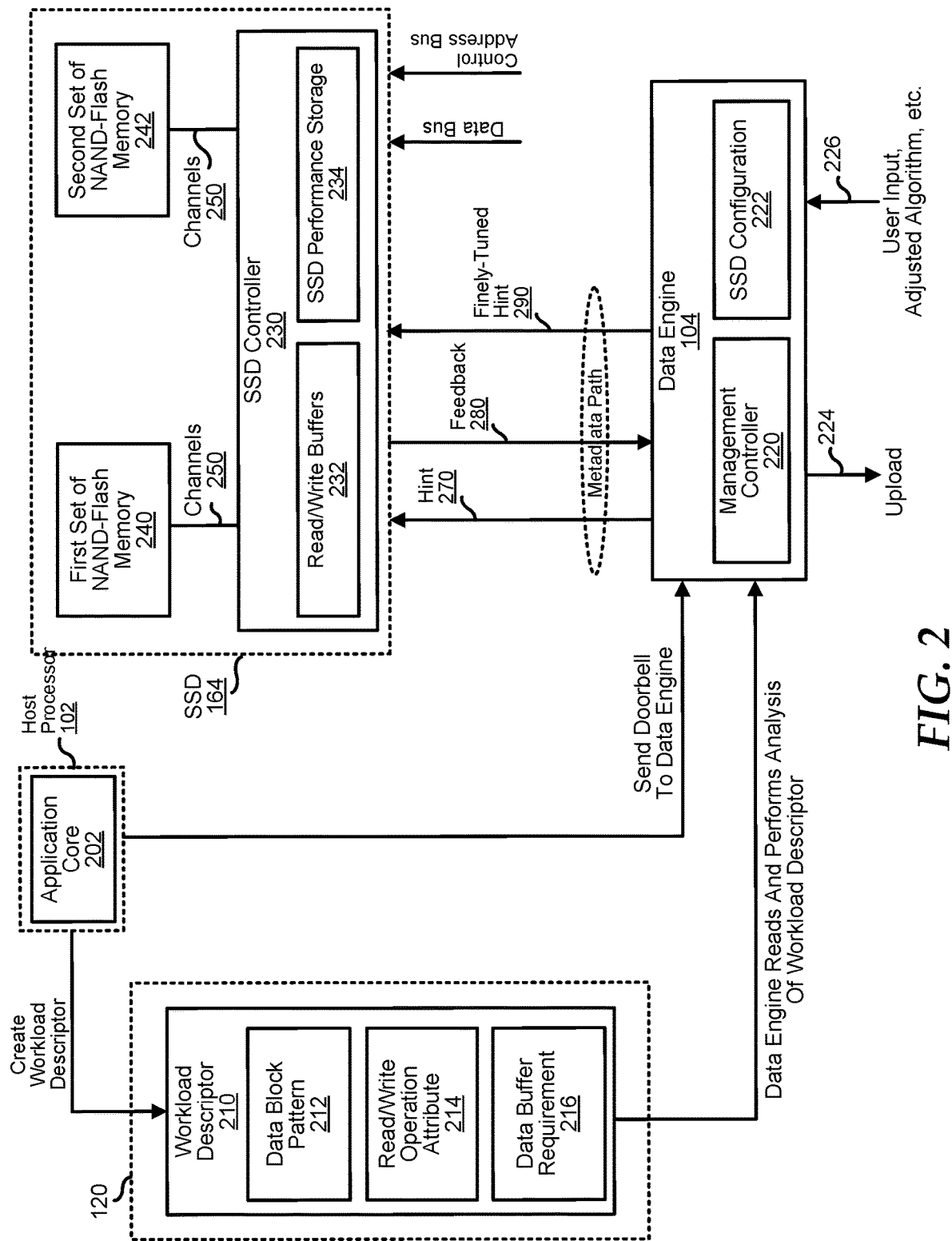
FIG. 2 is a block diagram of a portion of the information handling system supporting a generation of a hint that facilitates an optimization of a storage device capability based on changing workload requirements, according to an embodiment of the present disclosure.

FIG. 2 shows a portion of the information handling system 100 including processor 102, data engine 104, memory 120, and SSD 164. In an embodiment, the processor 102 may be configured to include an application core 202 that writes the metadata such as a workload descriptor 210 to the memory 120. In another embodiment, the workload descriptor may reside in another storage type within the information handling system 100 since they are statistical models and not limited to real time counters that only rely on the memory. The data engine 104 reads the workload descriptor and performs an analysis of workload descriptor attributes that represent workload requirements to implement the application program. The analysis may include, for example, comparing the attributes or workload attributes to a capability of the SSD 164 to optimize SSD configuration. The SSD capability may include the ability to optimize unnecessary garbage collection, ability to store data, and other available key parameters of the SSD. Based on this analysis, the data engine 104 may generate the hint that facilitates the optimization of the SSD capabilities based on the workload requirements indicated in the workload descriptor. The monitoring of the workload descriptor and the generation of the hint may be performed within a metadata path or outside of actual data path. In an embodiment, the data engine may improve or finely-tune the generated metadata that was initially presented to the SSD as it adapts to changing workload requirements as well as to changes in the technology and capabilities of the SSD. In this embodiment, the initial generation of the hint and the generation of the finely-tuned hint implement an intelligent dynamic application-aware storage optimization in the information handling system.

Data engine 104 may include a management controller 220, an SSD configuration 222, an uploading interface 224, and a downloading interface 226. The SSD 164 may include an SSD controller 230 that may be connected, for example, to a first set of NAND flash memory 240 and to a second set of NAND flash memory 242 through NAND channel interfaces 250. The SSD storage controller 230 further includes read/write buffers 232 and SSD performance storage 234. The SSD 164 may further include a data bus and a control address bus that facilitates the actual data path. The workload descriptor 210 may include workload attributes or metadata such as a data block pattern 212, read and write operation attribute 214, and data buffer requirement 216. Other workload attributes of the workload descriptor may include encryption and decryption requirements, memory fragmentation requirements, latency requirements, temperature versus power requirements, wear leveling requirement, and the like. Furthermore, multiple workload descriptors may be written or queued in the memory by the application core. The different workload descriptors may represent different workload requirements or pattern of I/O from the same application program to be implemented, from different application programs, or from a combination thereof.

In an embodiment, the data engine may perform a high-level analysis and/or a low-level analysis of the workload descriptors. The high-level analysis may include selection of a priority workload descriptor from a set of workload descriptors while the low-level analysis may include further characterization of the workload attributes of the selected workload descriptor. In this embodiment, the data engine may use algorithm, adjusted algorithm, a user input, or a combination thereof, when performing the high-level and/or the low-level analysis.

Based on the performed analysis, the data engine may supply a dynamic control signal such as a hint 270 to the SSD. The hint may indicate to the SSD to maintain or adjust its present configuration. In an embodiment, the SSD may reply with a feedback 280 that includes measured figure of merits such as measured SSD performance based on the use of the hint 270. Based on the feedback, the data engine may send a finely-tuned control signal such as a finely-tuned hint 290. This process of generating the finely-tuned control signal may be performed at the time of receiving the feedback or after a set period of time.

Furthermore, the user input may order the fine-tuning of the generated hint based upon the feedback, from the changing workload requirements, from initial SSD configuration, from changes in the capabilities of the SSD, or a combination thereof.

The application core 202 may include one of the processing cores in the host-processor 102. The application core 202 may be configured to run software, program, or application that creates the workload descriptor or set of workload descriptors. In an embodiment, the stored workload descriptor may be associated to an operation that is to be performed on the SSD 164. For example, the workload descriptor is associated to a frequency of a move operation of data from the first set of NAND flash memory 240 to the second set of NAND flash memory 242. The NAND flash memories are types of non-volatile storage devices that do not require power to retain data. In this example, the created workload descriptor may be associated to the frequency of reading a data range to the first set of NAND flash memory and writing of the read data range to the second set of NAND flash memory. In this example still, the workload descriptor or metadata may further include data block pattern requirements, data buffer requirements, and other attributes that may represent the workload requirements for the move data operation.

In an embodiment, the application core may write additional workload descriptors that may specifically target the same SSD. Furthermore, the stored workload descriptor 210 may be adjusted over time by the application core based on changing workload requirements, application program parameters, user input, and the like. For example and at a particular time instant, the changes in the workload requirements may include variations in data block patterns, data block sizes, read and write ratio, sequential versus random data streams, queue depth, write intensity such as likelihood of wear-out, performance vs. power optimization, read and write buffer sizes, and the like. In this example, the application core is configured to adjust the present workload attributes of the workload descriptor and adapt to the changes in the workload requirements. The presented attributes of the workload descriptor are limited to data block pattern 212, read and write operation attribute 214, and data buffer requirements 216, for ease of illustration. Other attributes may be included in the workload descriptor depending upon details of the application program workload requirements, user input, and the like.

In an embodiment, the data block pattern 212 is a workload descriptor attribute or metadata that may indicate data block placements, data block placement sequence, and the like, of the workload requirement. For example, for a move data operation in the SSD, the data block pattern 212 may include a source-memory address range and destination-memory address range. In this example, the move operation may utilize the source-memory address range for the read data while the destination-memory address range may be used for write data. In this example still, the data block pattern may further include data layout, sizes, data placements, and other attributes related to the move data operation.

The read and write operation attribute 214 is a workload descriptor attribute or metadata that may include read and or write operations to be performed, frequency of read and or write operations, sequence of the read and write operations, prioritization of the read and write operations for multiple workload requirements, and the like. For example, the sequence of the read and write operations may include performing of the read operations twice for every single write operation. In another example, the read and write operation attribute may include a read operation only over a time period. In another example still, the read and write operation attribute may include the frequency of read and or write operations over a time period.

The data buffer requirement 216 is a workload descriptor attribute or metadata that may include amount of buffer sizes for each read data and or write data operations. For example, for the move data operations between the first set of NAND flash memory 240 and the second set of NAND flash memory 242, the data buffer requirement may indicate the required buffer sizes for the read data and the write data. In another example, the data buffer requirement may indicate sequence of changing the required buffer size for the read data and or write data.

In an embodiment, the workload descriptor 210 may include other workload attributes to describe or characterize the workload requirements of a particular application program. In this embodiment, these attributes are analyzed by the data engine for purposes of optimizing current capabilities of the SSD. The current capabilities of the SSD may be based upon its initial configuration and an amount of workload that it is already processing. Over time and for multiple workload descriptors corresponding to multiple workload requirements, the data engine may facilitate storage device manipulations according to the changing workload requirements.

With the stored descriptor in the memory, the processor 102 may send a doorbell to the data engine 104. The doorbell may indicate presence of the workload descriptor 210 in a submission queue slot of the memory 120. The submission queue slot is a circular buffer with a fixed slot size that the software, program, or application may use to submit the workload descriptor 210. In response to the received doorbell, the data engine 104 may send a command fetch to the memory 120. The memory is configured to send the workload descriptor to the data engine in response to the received command fetch. In other embodiments, the descriptor may be stored to a different storage and any other type of asynchronous notification method may be utilized to inform the data engine.

The data engine 104 may include an offload processor that is configured to analyze the workload attributes in one or more stored workload descriptors in the memory 120 or from a different storage. In an embodiment, the data engine may include a circuit or hardware that may be disposed on a separate processor, within the host-processor, within the chipset, or outside of the information handling system 100. In another embodiment, the data engine may be a program that runs in the processor, or in the remote management system of a datacenter.

In an embodiment, the SSD configuration 222 may include a circuit that stores the initial and contemporaneous configurations of the SSD. For example, the initial SSD configuration may be detected by the BIOS and the detected SSD configuration is supplied by the BIOS to the data engine during data engine initialization. The contemporaneous configuration of the SSD may include present status of data buffers, data blocks, and other parameters of the SSD at a particular time instant when the SSD is already processing workloads. The contemporaneous configuration may be based upon the feedback from the SSD. In this example, the management controller may derive the capability of the SSD based on the initial and the contemporaneous configurations of the SSD. For example, the initial SSD configuration includes availability of the first and second sets of NAND flash memory. The contemporaneous configuration involves processing of a workload descriptor that uses the first set of NAND flash memory 240 half of the time when compared to the second set of NAN flash memory 242. In this example, the initial and contemporaneous configurations are stored in the SSD configuration of the data engine.

In an embodiment, the management controller 220 may be configured to read the workload descriptor and to perform an analysis of the read workload descriptor or set of workload descriptors. For example, the management controller may first compare the contemporaneous and initial configurations of the SSD that are stored in the SSD configuration 222. The contemporaneous configurations may vary over a time period while the initial configuration does not except in case of updates in the technology and capability of the SSD. Based upon the comparison between contemporaneous and initial configuration of the SSD, the management controller may be able to determine the present SSD capability. The present or available SSD capability, for example, may indicate portions of the NAND flash memories that are available for use, current sizes of data and or write buffers, amount of used data write buffers, amount of used read data buffers, amount of bad blocks, amount of available latency adjustments, available data block placements and layout, and the like. In this example after the determination of the SSD capability, the management controller may perform the low-level analysis by comparing the attributes of the workload descriptor to the determined present capability of the SSD.

In an embodiment, the management controller performs the high-level 1 analysis among queued workload descriptors in the memory and based on this high-level analysis, the management controller generates the workload descriptor such as the workload descriptor 210. The selection of the workload descriptor, for example, may be based upon workload descriptor priorities configured by the application core or based upon the user input. After the high-level analysis is performed, the management controller may perform low-level analysis on the workload attributes of the generated workload descriptor. For example, the low-level analysis may include performing of algorithm to optimize the present capability of the SSD in relation to the attributes of the workload descriptor. The algorithm, for example, notes the amount of write data buffer requirement from the data buffer requirement 216 and compares this amount to the unused write data buffer from the first set of NAND flash memory and second set of NAND flash memory. The unused write data buffer includes the SSD capability that may be derived from the initial and contemporaneous SSD configurations. In this example, the algorithm may determine that the second set of NAND flash memory may provide optimum choice for the write data buffer requirement. As such, the management controller may generate the hint 270 that indicates to the SSD controller 230 to use the second set of NAND flash memory for the workload descriptor 210.

The management controller may generate the hint 270 based on the performed analysis of the workload descriptors. The hint may include controlling metadata or control signals that are received by the SSD controller 230. For example, the performed low-level analysis indicates that the use of the second set of NAND flash memory is more appropriate for the attributes of the workload descriptor 210. In this example, the hint as control signal may facilitate data placement, dynamic sizing of buffer spaces, and alteration of data placement in the first set and second set of NAND flash memories. Furthermore, the hint may facilitate zoning of data to improve performance and or power consumption, and other adjustments to influence content of flash translation layer in the SSD for more optimum data mapping.

In an embodiment, the initially generated hint to the SSD controller may be used to calibrate the SSD. That is, the hint is used by the data engine to obtain the feedback 280 that includes latency measurements, data placements, resulting bad block, and other resulting parameters due to the use of calibrating hint. In this embodiment, the data engine fine-tunes the initially generated hint and sends the finely-tuned hint to the SSD. The finely-tuned hint may include a different control signal that facilitates further adjustments in the data placement, dynamic sizing of buffer spaces, and alteration of data placement in the first set and second set of NAND flash memories.

The SSD controller 230 is an internal memory controller that manages the data flow in the SSD. The SSD controller may include the read and write buffers 232 to indicate amount of available read or write buffers. The SSD controller may further use the SSD performance storage 234 to determine efficiency and figure of merit of the data flow based upon the implementation of the hint. For example, the SSD performance storage may include measured SSD latency, resulting number of bad blocks, resulting memory fragmentations, and the like. In this example, the SSD controller is configured to send to the data engine the feedback 280 that includes figure of merit for using the hint.

The data engine receives and utilizes the feedback 280 to update the SSD configuration 222. That is, the SSD contemporaneous configuration parameters are updated through the feedback. The data engine compares the updated SSD contemporaneous configuration parameters with the SSD initial configuration to derive the present capability of the SSD. With the derived present capability, the data engine may perform another low-level analysis of the attributes to correct the deficiency or address the shortcoming of the initially generated hint. In an embodiment, the management controller may receive algorithm, adjusted algorithm, updates, user input, and the like, through the download interface 226. For example, the adjusted algorithm or the user input may be used to send the finely-tuned hint 290 to the SSD. Similarly, the management controller may continuously upload 224 the present configuration of the SSD, feedback, generated hints, and the like, to another storage, server, or cloud. In the datacenter where the remote management system manages thousands of servers or equipment, the data engine may utilize the upload 224 to transmit the generated hint, analyzed workload descriptors, and other data for further processing by the remote management system.

Figure 3:
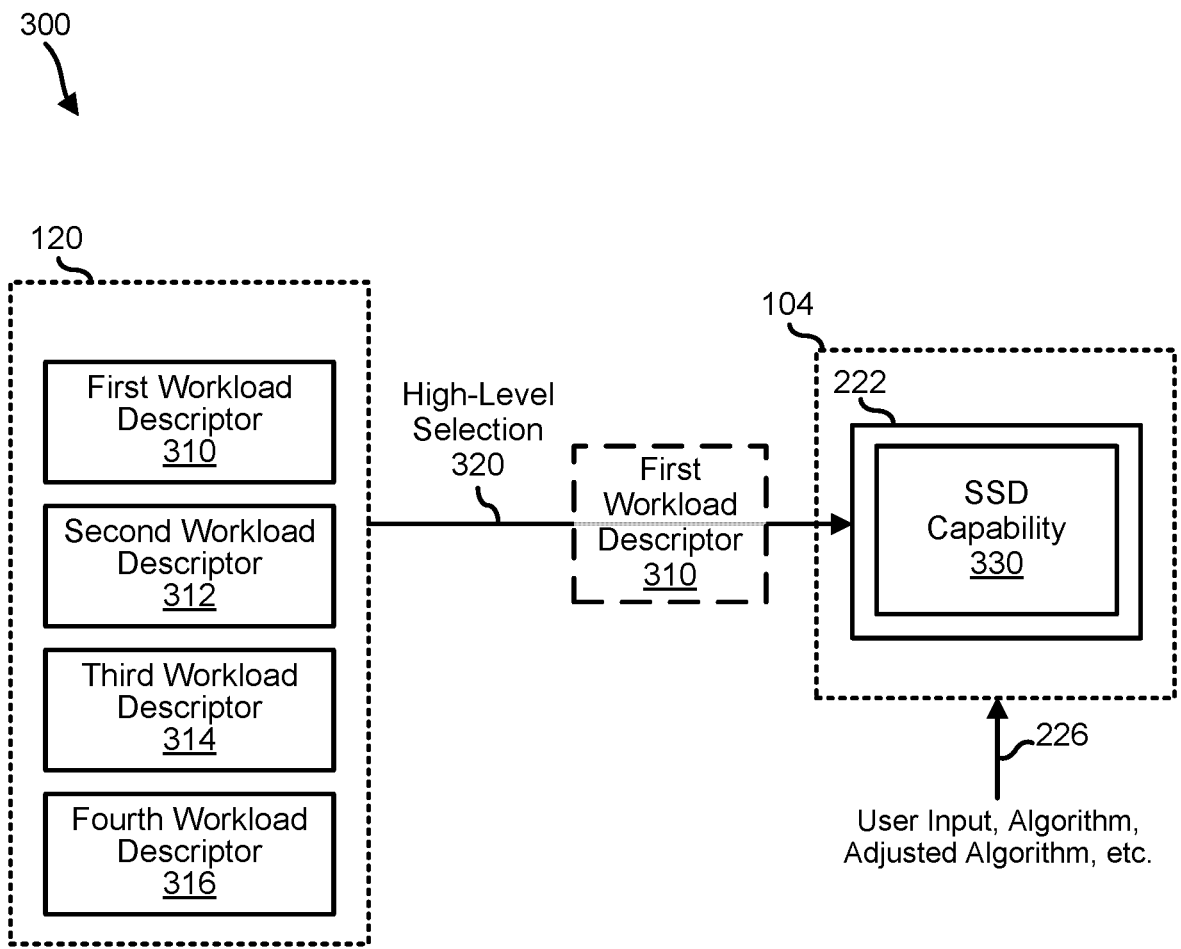
FIG. 3 is a block diagram of a portion of the information handling system performing an analysis of a workload descriptor, according to an embodiment of the present disclosure.

FIG. 3 shows a high-level analysis 300 that may be performed by the data engine on the workload descriptors in the memory. In an embodiment, the application core 202 may write multiple workload descriptors 310, 312, 314, and 316 for different application programs or workload requirements. In this embodiment, the management controller 220 may perform a high-level selection 320 of the workload descriptor to be further analyzed at a lower level. In an embodiment, high-level selection 320 may be based upon SSD capability 330 of the data engine. The SSD capability may be derived from the comparison between the contemporaneous SSD configurations and the initial SSD configurations stored in the SSD configuration 222. In this embodiment, the data engine may perform the selection of the workload descriptor based upon optimal application of the derived SSD capability. In other embodiments, the high-level selection may be based upon the user input that may be received through the download interface 226. In this other embodiment, parameters other than the SSD capability may be used by the user to perform the high-level selection that implements the high-level analysis by the data engine on the workload descriptors.

In another embodiment, the workload descriptors 310, 312, 314, and 316 are configured to be processed on a first-in-last-out basis. For example, the workload descriptor 310 is the last workload descriptor to be written in the memory. In this example, the high-level analysis may include the selection of the workload descriptor 310 based upon the prioritization configured on the workload descriptors. That is, the management controller 220 performs the high-level selection of the workload descriptor based upon how the processing flow of the workload descriptors is configured.

In the above embodiments and after the high-level selection is performed by the management controller 220, the selected workload descriptor may undergo low-level analysis that includes detailed analysis of the workload attributes in relation to the SSD capability. In this embodiment, the management controller may analyze the data block pattern, read and write operation attributes, data buffer requirement, and other attributes of the selected workload descriptor. The low-level analysis of the workload attributes may facilitate generation of the hint by the management controller.

Figure 4:
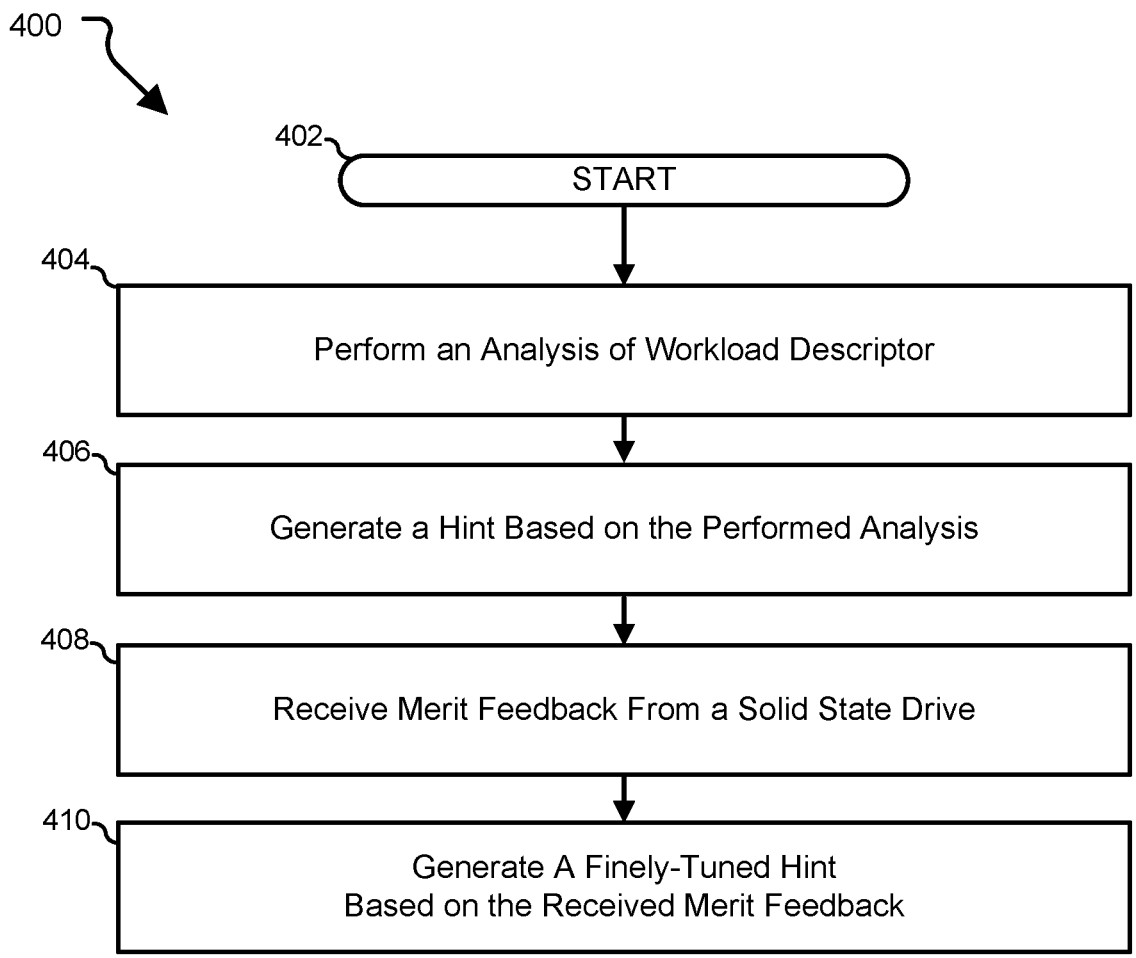
FIG. 4 is a flow chart showing a method of intelligent dynamic application-aware storage optimization in the information handling system, according to an embodiment of the present disclosure.

FIG. 4 shows a method 400 of implementing intelligent dynamic application-aware storage device optimization using a data engine, starting at block 402. At block 404, the data engine performs high-level and low-level analysis of the workload descriptor. The high-level analysis includes selection of the workload descriptors among a set of workload descriptors while the low-level analysis includes comparing workload attributes of the selected workload descriptor with contemporaneous capability of the SSD. At block 406, the data engine generates a hint based upon the performed analysis on the workload attributes in relation to the contemporaneous capability of the SSD. At block 408, the data engine receives feedback from the SSD. At block 410, the data engine generates a finely-tuned hint to address the deficiency of the initially generated hint. In this case, a feedback loop is utilized by the data engine to continuously improve performance of data flow in the SSD.

For purpose of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware.

An information handling system can also include one or more computer-readable medium for storing machine-executable code, such as software or data. Additional elements of an information handling system can include one or more storage devices that can store machine-executable code, one or more communications ports for communicating with external devices, and various I/O devices, such as a keyboard, a mouse, and a video display. An information handling system can also include one or more buses operable to transmit information between the various hardware elements.

In accordance with various embodiments of the present disclosure, the methods described herein may be implemented by software programs executable by a computer system. Further, in an exemplary, non-limited embodiment, implementations can include distributed processing, object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system having improved storage optimization, comprising:
   an application core that is configured to create a plurality of workload descriptors, and to queue the workload descriptors in a memory;
   a data engine to perform an analysis of the workload descriptors, during the analysis of the workload descriptors, the data engine to:
      calculate a present capability of a storage device based on a comparison between a contemporaneous configuration and an intial configuration of the storage device, wherein the contemporaneous configuration varies over a time period;
      compare workload attributes of the workload descriptors to the calculated present capability of the storage device, and
      determine an optimization of the storage device based on the comparison of the workload attributes of the workload descriptors to the calculated present capability of the storage device;
   the data engine further to generate a hint to indicate the determined optimization of the storage device based on the performed analysis; and
   a storage device that is configured to use the hint in managing data flow.

2. The information handling system of claim 1, wherein the analysis includes a high-level analysis and a low-level analysis.

3. The information handling system of claim 2, wherein the high-level analysis includes selecting of the workload descriptor from the workload descriptors.

4. The information handling system of claim 3, wherein the selecting of the workload descriptor is based upon a priority configured on the workload descriptor.

5. The information handling system of claim 3, wherein the low-level analysis includes the comparison of the workload attributes of the selected workload descriptor to the calculated present capability of the storage device.

6. The information handling system of claim 5, wherein the workload attributes include data block pattern, read and write operation attribute, and data buffer requirement.

7. The information handling system of claim 1, wherein the hint includes a control signal sent to a controller of the storage device, wherein the controller utilizes the control signal to manage the data flow in the storage device.

8. The information handling system of claim 1, wherein the storage device is configured to send a feedback to the data engine based on a measured storage device performance when using the hint.

9. The information handling system of claim 8, wherein the data engine is configured to send a finely-tuned hint in response to the feedback.

10. The information handling system of claim 9, wherein the finely-tuned hint is based upon a user input.

11. A method comprising:
   creating a plurality of workload descriptors;
   performing an analysis of each one of the workload descriptors, the analysis including:

calculating a present capability of a storage device based on a comparison between a contemporaneous configuration and an intial configuration of the storage device, wherein the contemporaneous configuration varies over a time period;

comparing workload attributes of the workload descriptors to the calculated present capability of the storage device, and determining an optimization of the storage device based on the comparison of the workload attributes of the workload descriptors to the calculated present capability of the storage device;

generating a hint to indicate the determined optimization of the storage device based on the performed analysis; and using, by a hardware storage device, the hint to manage data flow.

12. The method of claim 11, wherein the analysis includes a high-level analysis and a low-level analysis.

13. The method of claim 12, wherein a data engine performs the high-level analysis by selecting one workload descriptor from the workload descriptors.

14. The method of claim 13, wherein the selecting of the workload descriptor is based upon a user input.

15. The method of claim 13, wherein the low-level analysis includes the comparison of the workload attributes of the selected workload descriptor to the calculated present capability of the storage device.

16. The method of claim 11, wherein the hint includes a control signal sent to a controller of the hardware storage device, wherein the controller utilizes the control signal to manage the data flow in the hardware storage device.

17. An information handling system comprising:

an application core that is configured to create a workload descriptor;

a data engine that is configured to perform an analysis of the workload descriptor during the analysis of the workload descriptor, the data engine to:

calculate a present capability of a storage device based on a comparison between a contemporaneous configuration and an intial configuration of the storage device, wherein the contemporaneous configuration varies over a time period;

compare workload attributes of the workload descriptor to the calculated present capability of the storage device, and determine an optimization of the storage device based on the comparison of the workload attributes of the workload descriptor to the calculated present capability of the storage device;

the data engine further to generate a hint to indicate the determined optimization of the storage device based on the performed analysis; and a storage device that is configured to use the hint in managing data flow.

18. The information handling system of claim 17, wherein the workload descriptor defines a workload requirement for an application program.

19. The information handling system of claim 18, wherein the workload attributes include data block pattern, read and write operation attribute, and data buffer requirement, of the workload descriptor.

* * * * *